Aug. 6, 1929.    J. PARSONS    1,723,068
MACHINE ADAPTED FOR PREPARING SELF LIGHTING CIGARETTES
Original Filed Oct. 28, 1925    6 Sheets-Sheet 1
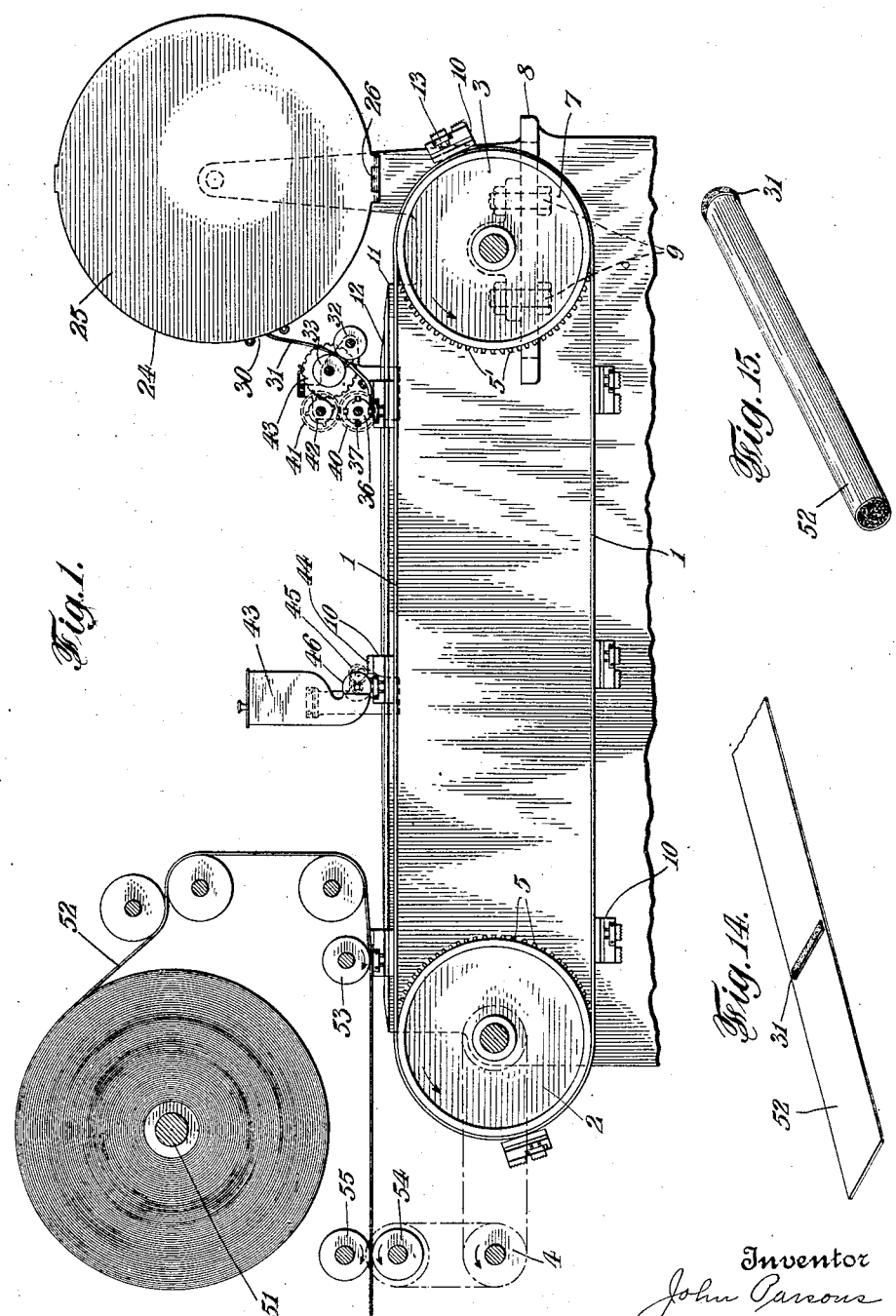

Aug. 6, 1929.  J. PARSONS  1,723,068
MACHINE ADAPTED FOR PREPARING SELF LIGHTING CIGARETTES
Original Filed Oct. 28, 1925  6 Sheets-Sheet 2
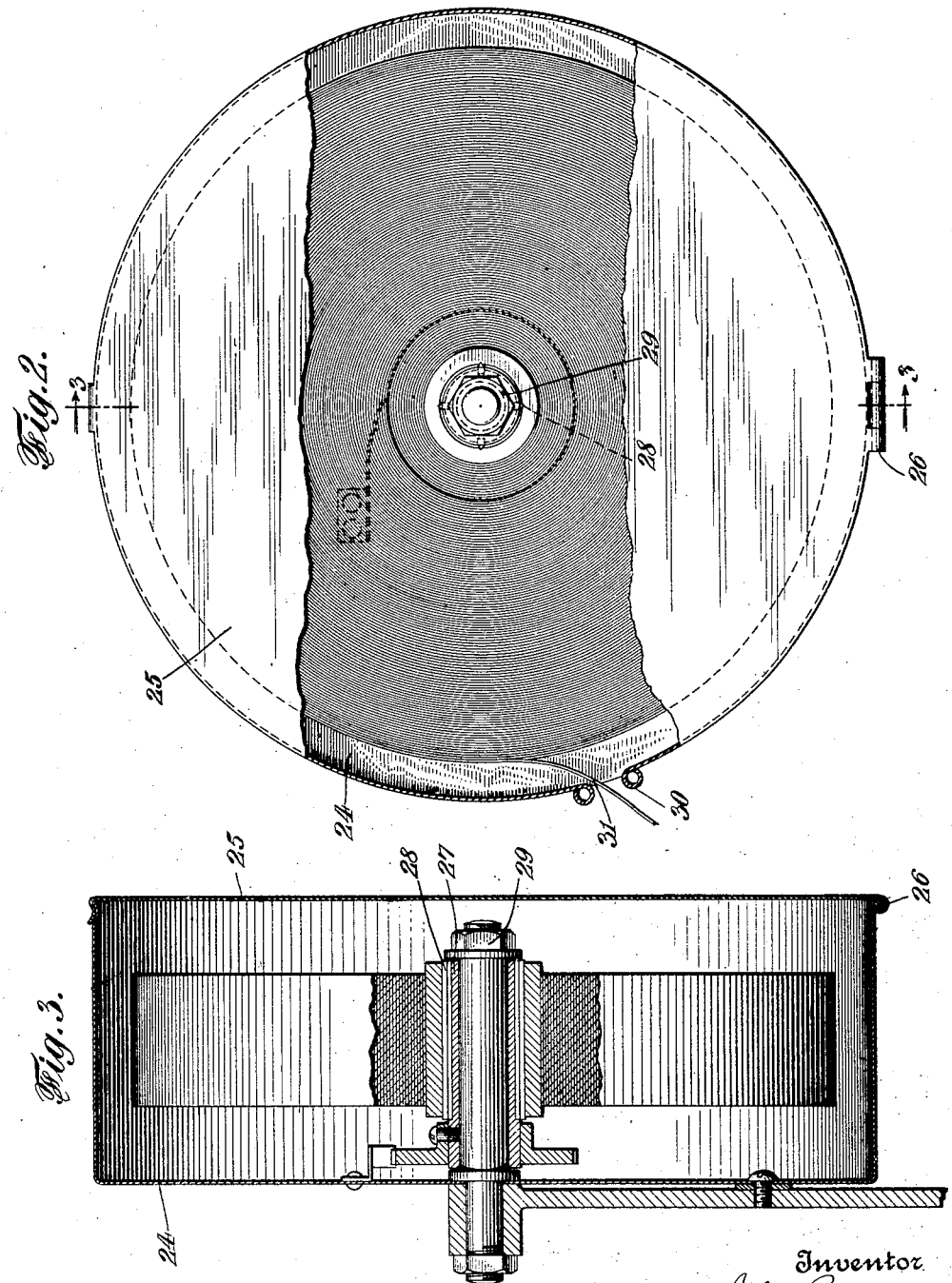

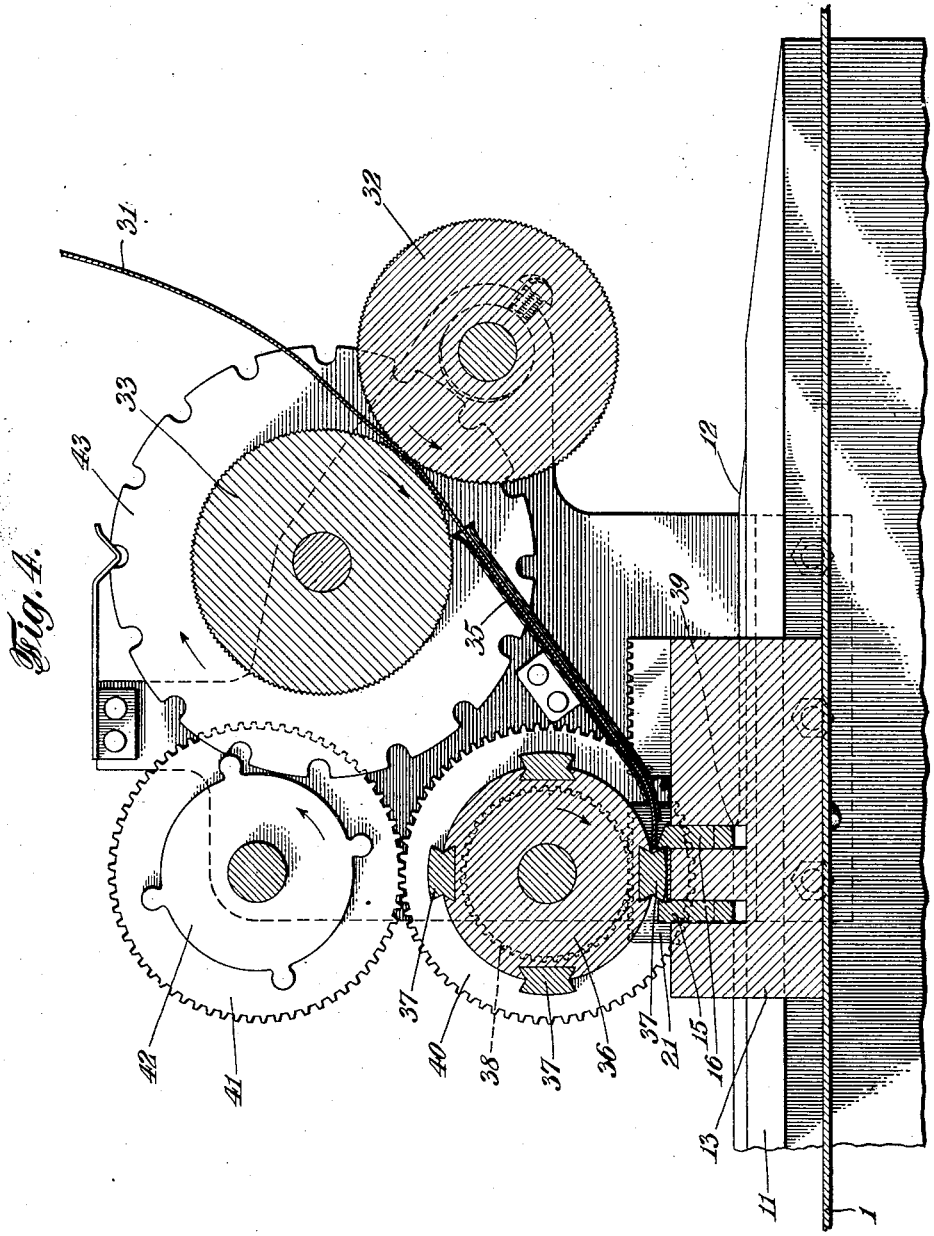

Aug. 6, 1929.   J. PARSONS   1,723,068
MACHINE ADAPTED FOR PREPARING SELF LIGHTING CIGARETTES
Original Filed Oct. 28, 1925   6 Sheets-Sheet 4
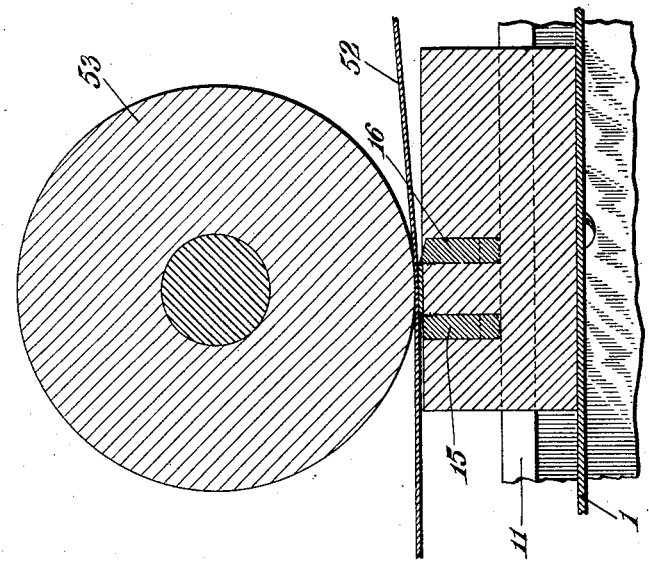
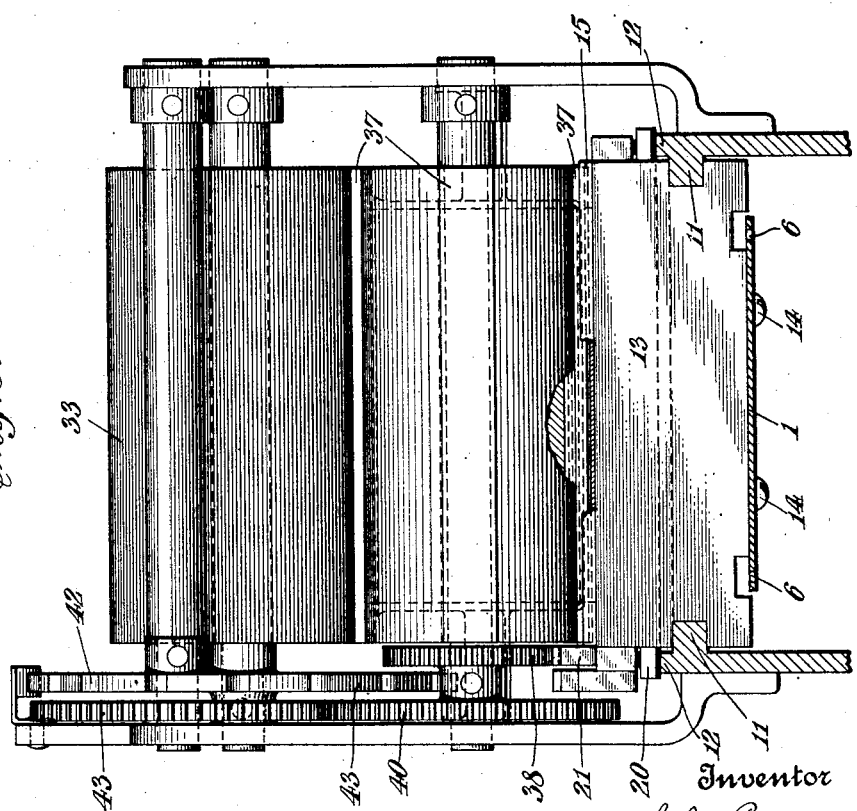
Inventor
John Parsons
By his Attorney
Kenyon & Kenyon Aug. 6, 1929.   J. PARSONS   1,723,068
MACHINE ADAPTED FOR PREPARING SELF LIGHTING CIGARETTES
Original Filed Oct. 28, 1925   6 Sheets-Sheet 5
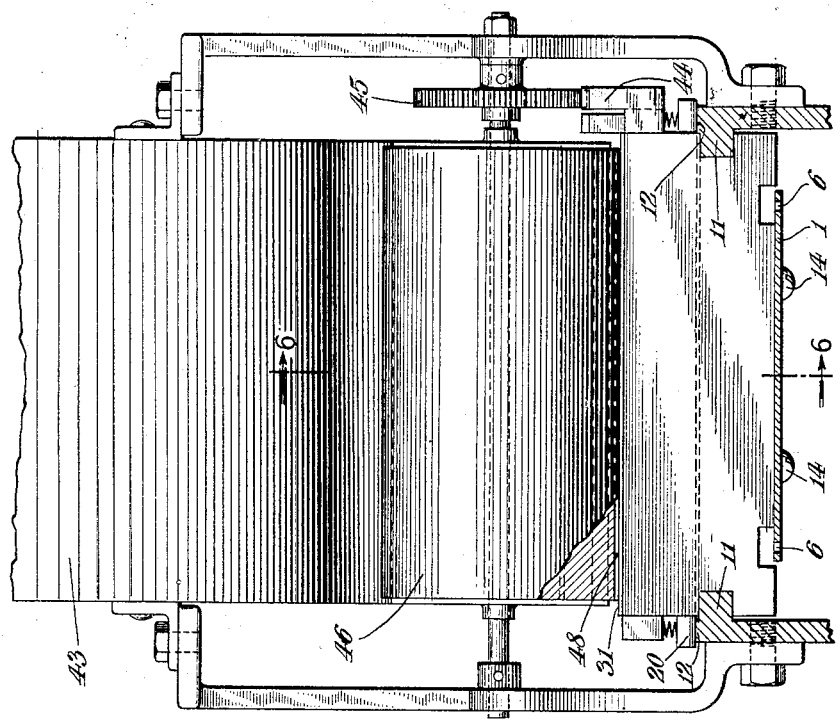
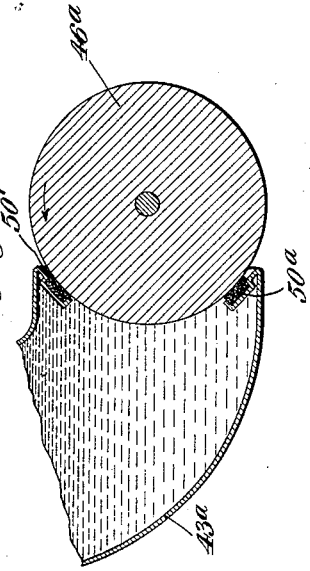
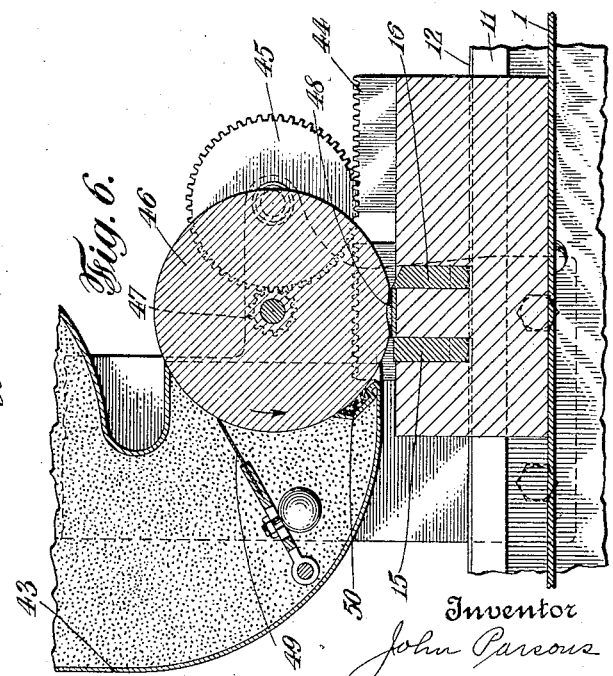
Inventor
John Parsons
By his Attorneys
Kenyon & Kenyon Aug. 6, 1929.                    J. PARSONS                    1,723,068
           MACHINE ADAPTED FOR PREPARING SELF LIGHTING CIGARETTES
                     Original Filed Oct. 28, 1925    6 Sheets-Sheet  6
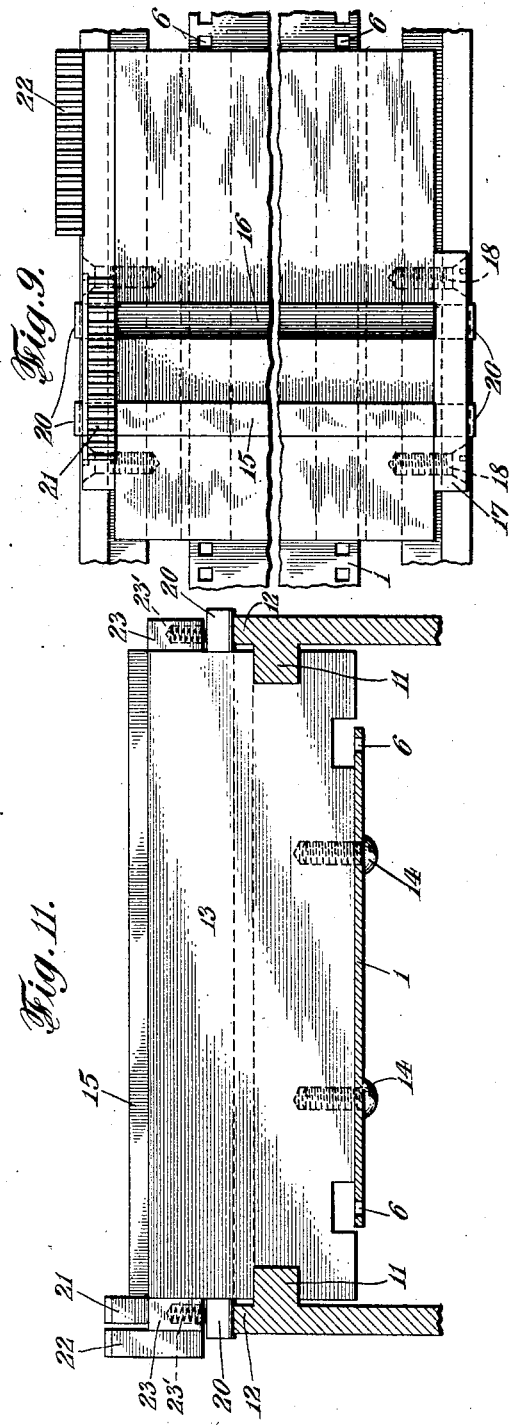
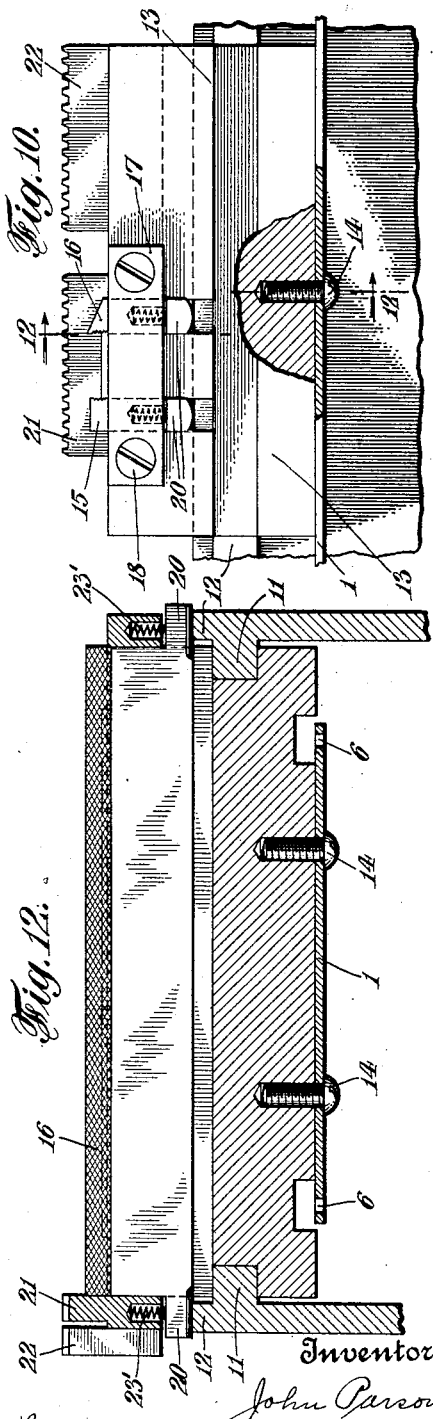
Inventor
John Parsons
By his Attorneys
Kenyon & Kenyon Patented Aug. 6, 1929.

1,723,068

UNITED STATES PATENT OFFICE.

JOHN PARSONS, OF BELLEVILLE, NEW JERSEY, ASSIGNOR TO PAN-ROSS LABORATORIES, INC., OF NEW YORK, N. Y., A CORPORATION OF NEW YORK.

MACHINE ADAPTED FOR PREPARING SELF-LIGHTING CIGARETTES.

Application filed October 23, 1925, Serial No. 65,278. Renewed December 13, 1928.

My invention relates to new and useful improvements in machines adapted for preparing self-lighting cigarettes, and its object is to provide means which will automatically apply to cigarette wrapping paper successive ignition bands of material for making them self-ignitible. My invention is likewise applicable to many other uses and is peculiarly adapted for the manufacture of self-lighting cigarettes. In the course of such manufacture, an ignition band is prepared of a combination of fuse and fulminate materials in ribbon form. By my machinery, such a ribbon is automatically cut into suitable sections and affixed to wrapping paper of the cigarette, which in turn may be made up into a finished self-lighting cigarette provided with an igniting band at its end. My invention provides for three distinct operations, namely, cutting of the ribbon ignition band into suitable sections, applying or forming a glue element on one side thereof, and affixing the band sections to the cigarette paper at suitable distances. Preferably, my machine is adapted to cut the band into sections of double the width required and apply the same to the cigarette paper at double cigarette lengths, so that when the eventual cigarette rod is formed as usual in machine-made cigarettes, it may be cut intermediate the band and also in the interval between the bands, thus forming a series of cigarettes respectively end to end with the band applied at one end. It will be noted that in my operation the ribbon band is fed in the direction of the cigarette paper but is applied in sections transversely to the cigarette wrapper. Other objects and purposes of my invention will be apparent from the detailed description hereinafter set forth. In such description, I have described and shown the preferred form of my machine. It is not to be understood, however, that I limit myself thereto, but the scope of my invention is as set forth in the claims appended hereto.

Referring to the drawings,

Figure 1 is a side elevation of a preferred form of my machine showing in turn the means for carrying on the three distinct operations referred to and likewise the conveyor mechanism for causing the operations to be carried on successively;

Fig. 2 is a side view, partly broken away, of the reel carrying the ribbon igniting band;

and Fig. 3 is a cross-section of Fig. 2 taken along the line 3—3;

Fig. 4 is a detail section of the cutting mechanism of the machine; Fig. 5 is a front view of mechanism shown in Fig. 4;

Fig. 6 is a detail sectional elevation of the mechanism for applying or forming glue on one side of the cut sections of the igniting band; Fig. 7 is a front view of same partly cut away;

Fig. 8 is a side section of a pasting roller in the machine;

Fig. 9 is a detail plan view of the conveyor carriage; Fig. 10 is a side view of same partly cut away, likewise showing the conveyor belt and track; Fig. 11 is an end view of same; and Fig. 12 is a section taken across the line 12—12 of Fig. 10;

Fig. 13 is a modified form of mechanism for forming glue on a side of the section of the cut igniting band;

Fig. 14 is a view of cigarette wrapping paper with the section of igniting band applied thereto; and Fig. 15 is a view of the completed self-lighting cigarette with the igniting band applied at the end thereof.

In the preferred form of my mechanism, I have provided for three distinct operations, namely, the feeding and cutting of the ribbon of material to form the igniting band and composed of fuse and fulminate elements; and, secondly, the operation of applying a glue or forming a glue on one side of the cut sections of the ribbon; and, thirdly, a pasting operation applying the cut sections of the ribbon to unwrapped cigarette paper. The fuse bands in ribbon form are fed by suitable feeding rollers to the mechanism for carrying on the first or cutting operation and likewise cigarette paper of the usual character is supplied to the machine prior to the third operation. In order to permit the three operations to be carried on successively, I have provided a conveyor mechanism which is so arranged as to permit ready adjustment to allow for the varying length of different kinds of cigarettes, as also different thickness. The conveyors operated by this mechanism are adapted to cooperate in the cutting operation and to carry the cut sections through the glue applying or forming operation and through the final or pasting operation.

Referring particularly to Fig. 1, my conveyor mechanism consists preferably of a steel belt 1 which is adapted to pass around in endless fashion a driving wheel 2 and an idler wheel 3. The driving wheel 2 is suitably mounted in a frame in the machine and is driven by any independent form of motive power or by cigarette machine power when used as attachment to same. In Fig. 1, I have illustrated this mechanism by means of the wheel 4 which may be connected to the drive wheel by a suitable belt or gear connection. The drive wheel 2 in my machine is likewise, as will hereafter be noted, adapted to operate the other moving parts of the mechanism, so that the same are operated at a definite, relative speed, thus causing precision in the operations involved in the apparatus. The driving wheel 2 is provided on its periphery with a series of sprockets 5. The endless belt 1 has provided at each side a series of corresponding holes 6 (see Figs. 9 and 12) with which these sprockets are adapted to engage, thus forming a positive drive for the flexible steel belt and causing its continuous motion with the drive wheel 2. The flexible steel band then passes over and around an idler wheel 7 which is mounted on a slotted frame 8 and held in position by set screws 9. The longitudinal position of the idler wheel is thus rendered adjustable.

Mounted on the outer surface of the flexible steel band are conveyor carriages 10 placed preferably at intervals of two cigarette lengths. Different length flexible bands may be prepared for different length cigarettes and may all be interchangeably mounted upon the driving and idling wheels by means of the adjustability of the idler wheel 7. This latter wheel is likewise provided with sprockets 5' again adapted to engage holes 6 along the edges of the flexible band.

Between the drive wheel 2 and the idler wheel 7 are conveniently located tracks 11 on which the conveyor carriages are adapted to run for a certain interval in their progress between the two wheels while still remaining attached to the flexible steel band 1 during its travel around the drive wheel and idler. Adjacent the tracks 11 are likewise provided elevating rails 12 which are adapted to operate the knives located in the carriages as hereinafter described. The elevating track 12 raises to its maximum height at and directly under the first mechanism and thereafter drops away for the second operation and reaches its lowest elevation at the time of the third operation, thus suitably operating the knives for the respective operations. A conveyor carriage 13 is fixedly mounted on the flexible belt 1 by means of screw 14. It is provided with two movable edges, a holding guard 15 and a shearing knife 16 mounted in vertical slots and held against lateral motion by plate 17 and screws 18. The carriage 13 is adapted to ride during the portion of its travel in the upper half of the travel on the tracks 11. The edges, which are movable vertically, in turn are provided with extensions 20 which are adapted to ride upon the elevating rail 12. Thus the height of the elevating rail 12 will determine the position and action of the edges 15 and 16 while the carriage will firmly ride upon the track 11. The carriage 13 is likewise provided with two staggered racks 21 and 22 which are adapted to engage respectively with pinions located in the mechanism for the first and second operations. The conveyor carriage 13 has an extension 23 (see Fig. 11) provided with a spring 23' adapted to rest upon and force downwardly the extension 20 of the edges and thereby cause the edges to follow closely the path of the elevating rail 12.

The ignition band may be supplied on suitable reels or bobbins which may be mounted in a feed box 24. This feed box is provided with a door 25 hinged at 26, thus permitting ready access to the reel or bobbin and permitting their free interchangeability, also reducing the fire hazard of same. The reel or bobbin is freely mounted on an axle 27 located in suitable bearings. This axle is provided with a series of ridges 28 and the reel or bobbin with a series of corresponding notches. The reels or bobbins may thereby be freely removed and replaced on the axle. The ridges fitting in the respective notches will hold the reel firmly in place on the axle. If desired, a nut 29 may be used to hold the reel or bobbin in place. The reel or bobbin is thus idly mounted and is adapted to feed the ribbon through the opening 30 as needed.

An opening 30 is provided in the circular feed box out through which the ribbon fuse band 31 is led to the cutting mechanism. This mechanism comprises suitably mounted feeding rollers 32 and 33 provided with fluted edges adapted to firmly grip the ribbon. The feeding rollers are actuated, as set forth hereafter, to cause the ribbon to be fed from the bobbin or reel through a lead passage 35 to the point of the cutting operation. This occurs beneath the roller 36. This roller is provided preferably with four regularly-arranged cutting dies 37 and is caused to rotate by a spur wheel 38 which, as the conveyor carriage passes underneath the wheel 36, in turn is rotated by means of engagement with the rack 21. The wheel 36 undergoes a quarter rotation and causes the dies 37 to co-operate with the knives 15 and 16, which have here been raised to their maximum height by the increase 39 in the elevation of the rail 12. The ribbon 31 is thereby sheared into sections of suitable width. During this operation, the section of the ribbon has been sheared by the coaction of the dies and the knives.

The die wheel 36 is likewise provided with a pinion arrangement 40 which is adapted to engage with pinion wheel 41. Mounted in connection with the pinion 41 and the feeding roller 33 is a Geneva connection consisting of the elements 42 and 43.

It will thus be observed that, as a conveyor carriage is carried by the motion of the belt 1 along the tracks 11, the engagement of the rack 21 with the pinion 38 and the elevation of the shearing knife 16 and forward guard 15 by the action of the elevating rail 12 will cause the dies and the knives to co-operate in shearing off a section of the ribbon which has been fed to that point. The complete operation will cause the die wheel 36 to pass through a quarter rotation. At the same time, the Geneva engagement between the connecting pinion 41 and the feed roller 33 will cause the latter to feed just sufficient amount of the ribbon 31 for the next shearing operation. The whole operation is positive and entirely dependent upon the rack and pinion connection between the carrier and the first pinion wheel.

The inside faces of both forward guard 15 and shearing knife 16 are slightly milled to assist in catching and holding the cut section of the ribbon. Inasmuch as the ribbon when sheared is placed at a slight angle, running from bottom of guard 15 to top of knife 16, the shearing will cause the section of fuse band to be slightly larger than the space between the guard and knife and a crimping effect will be produced assuring the positive carriage in proper position to succeeding operations of the cut fuse band irrespective of the angular positions of the carriage.

The fuse band is fed in continuous ribbon form from the reel through the rollers to the conveyor carriage where it is cut with its outside or fulminating face downwardly.

The conveyor carriage passes free and clear of the mechanism for cutting the fuse band and thence carries the cut section to the second operation, that of applying or forming a glue element on the inside of the band. This is accomplished by means of a glue reservoir 43. The staggered rack 44 on the conveyor carriage engages a pinion 45. This pinion is adapted to rotate a gluing roller 46 by means of engagement with the spur 47. The roller 46 in the form preferably used where a direct gluing operation is desired is formed with a depression such as 48, which is adapted to pick up and hold a small quantity of glue. The depression should be approximately the width of the cut section of fuse band. The gluing roller 46 is revolved in the direction of the arrow by the rack and pinion arrangement described and passes closely into contact with the glue reservoir 43, which may be filled with any suitable glue, preferably of a composition which is homogeneous with the base used in the fuse band. A scraper knife 49 mounted in the glue reservoir removes any excess of unused glue. The depression 48 as it passes through the contact with the glue reservoir will pick up a small amount of the glue. Other parts of the roller will be kept wiped free of the glue by means of wiper 50. Thus the roller carrying in the depression the proper amount of glue will, by virtue of the rack and pinion arrangement, come into contact with the back of the cut section of the fuse band lying between the shearing knives. At this point of the track, the elevating rail 12 loses some of its height and the knives are therefore brought nearer the surface of the carriage. The forward guard 15, as is illustrated in Fig. 6, preferably is raised just slightly above the surface of the carriage and below the upper surface of the cut section of fuse band; whereas the knife 16 is about flush with the top of the cut section of fuse band. Thus, when the roller carrying the glue in the depression comes into contact with the cut section of the fuse band crimped between the knives, the glue will be properly applied to the back of such section.

If in the composition of the fuse band a homogeneous base is used, such, for example, as a nitrocellulose compound, such base will upon application of the proper solvent soften and act as a glue, then it may be desirable to use a modified form of gluing roller such as shown in Fig. 13. For example, if the fuse band has as a base a nitrocellulose compound, a solvent of nitrocellulose such as ethyl acetate may be kept in reservoir 43$^a$ and the roller 46$^a$ being rotated as before by a rack and pinion engagement will pick up a certain amount of the solvent on its surface. Wipers 50$^a$ and 50'$^a$ may be provided to prevent the solvent from leaking out of the reservoir. The wiper 50'$^a$ may also be adjusted so as to permit a slight amount of the solvent to remain on the surface of the roller. This slight amount of solvent, when coming in contact as before with the back of the cut section of the fuse band, held crimped between the knives, will dissolve or soften a certain amount of the nitrocellulose base of the fuse band which will itself function as a glue for the third or pasting operation.

The conveyor carriage then passes to the pasting wheel. Cigarette wrapping paper 52 is led from the usual bobbin on cigarette-making machine illustrated as 51 through suitable rollers to a pasting roller 53. The paper 52 passes directly under the pasting roller 53. The conveyor carriages likewise pass closely under the roller 53. The elevating rail 12 at this part of the track is further lowered so that the forward guard edge 15 becomes substantially flush with the surface of the carriage and the rear knife 16 is only slightly above the surface of the carriage and below the upper surface of the cut section of fuse band. Thus when the carrier passes under the roller 53, direct application is made of the cut section of the fuse band with the glue on its upper surface to the passing cigarette paper and becomes pasted thereon.

The feeding of the cigarette paper is controlled by means of a delivery roller 54 with its supplementary roller 55. The roller 54 is directly driven by belt, chain or gear connection from the wheel 4, which in turn is operated by a motive power as previously described. The connection between the roller 54 and wheel 4 should be so arranged that the cigarette paper is fed at just sufficient speed so that the carrier conveyors shall cause the pasted strip of cut sections of fuse band to be applied at the correct lengths, preferably double cigarette lengths. This may be accomplished by having a direct driving connection between the wheels 54 and 4 and having the carrier conveyors located at distances apart of exactly double cigarette lengths. The cigarette paper is thus fed from the machine with the fuse band applied to one side of it at double cigarette lengths of a width double that desired on the finished cigarette. The cigarette paper may then be filled and wrapped in the usual manner and cut into cigarette lengths. The cutting should take place intermediate the band and halfway between the bands. Thus a series of self-lighting cigarettes respectively end to end will be formed with the bands applied to their respective lighting ends.

In my machine, it will be noted that I feed the fuse ignition ribbon in a given direction along with the line of travel of the conveyor carriages and cut sections of the fuse ignition ribbon across such direction. Following the application of the glue, the cut sections of the ribbon are pasted transversely across or transverse to the cigarette wrapping paper which is fed from suitable rollers also along the line of travel of the conveyor carriages.

In the manufacture of self-lighting cigarettes, it is necessary to apply a band to them in a narow form, as only a small amount of ignition tip is desirable in the finished product. The problems encountered in this manufacture are therefore different from the other banding operations for cigarettes where the sections to be cut and applied to the cigarette are of considerably greater width. The results set forth are obtained by cutting portions from the supplied strip of ignition band at a point in the path or line of travel of the conveyor carriages, moving on the carriages the portions so cut and pasting these portions to the cigarette paper while the paper is moving along the line of travel of and at the same speed as the conveyor carriages.

I have thereby provided a simple and efficient machine with a positive timing arrangement whereby the fuse band fed in ribbon form may be cut into sections, glue applied or formed on one side thereof, and the sections pasted to the cigarette paper at the proper intervals.

Having thus described my invention, what I claim as new and desire to secure by Letters Patent of the United States is:

1. In a machine of the character described including cutting and pasting means, a conveyor mechanism adapted to coordinate said cutting and pasting means comprising a conveyor belt, a series of carriages mounted thereon and means for operating said mechanism.

2. In a machine of the character described including cutting and pasting means, a conveyor mechanism adapted to coordinate said cutting and pasting means comprising the combination of a conveyor belt, a series of carriages mounted thereon and a plurality of adjustably spaced rotatable means adapted to operate said belt.

3. In a machine of the character described, the combination of ribbon feeding and cutting mechanism and a conveyor carriage, said cutting mechanism comprising a die cutting roller, shearing means in said carriage, and means for operating said shearing means in conjunction with said die.

4. In a machine of the character described, the combination of ribbon feeding and cutting mechanism and a conveyor carriage, said cutting means comprising feeding means, cutting dies, and means in said carriage for positively operating said feeding means and cutting dies.

5. In a machine of the character described, the combination of ribbon feeding mechanism, cutting dies, a conveyor carriage provided with a shearing knife, and means for operating said knife in conjunction with said dies and operating said ribbon feeding mechanism.

6. In a machine of the character described, the combination of a ribbon feeding roller, a cutting die roller, engagement means between said rollers, a conveyor carriage provided with a shearing knife, and a rack adapted to engage pinion of said cutting die roller, a track for said carriage, and an elevating rail adapted to operate said shearing knife.

7. In a machine of the character described including cutting and pasting elements, a conveyor carriage, means for moving said carriage, a shearing knife in said carriage, a track for said carriage, means associated with said track adapted to operate said knife.

8. In a machine of the character described, the combination of a ribbon feeding roller, a cutting die roller, engagement means between said rollers, a conveyor carriage provided with a milled shearing knife and a forward edge, and a rack adapted to engage a pinion on said cutting die roller, a track for said carriage, and an elevating rail adapted to operate said shearing knife.

9. A machine of the character described comprising the combination of ribbon cutting mechanism, adhesive applying means comprising a glue pot and a roller, a traveling conveyor carriage provided with means for holding the cut sections of ribbon for application of glue, and a rack on said carriage adapted to engage a pinion connected with said roller.

10. In a machine of the character described provided with ribbon cutting mechanism, glue affixing means, and pasting means for affixing cut sections of ribbon transversely to a paper roll, the combination of a traveling conveyor carriage provided with a holding edge and a shearing edge movable vertically, means for operating said carriages, a track for said carriages, and an elevating rail for operating said edges, said rail having a maximum effect at the point of cutting operation.

11. In a machine of the character described provided with ribbon cutting mechanism, glue affixing means, and pasting means for affixing cut sections of ribbon transversely to a paper roll, the combination of a traveling conveyor carriage provided with a holding edge and a shearing edge movable vertically, means for operating said carriages, a track for said carriages, and an elevating rail for operating said edges, said rail having a maximum effect at the point of cutting operation and minimum effect at point of pasting operation.

12. In a machine of the character described provided with ribbon cutting mechanism, glue affixing means, and pasting means for affixing cut sections of ribbon transversely to a paper roll, the combination of a traveling conveyor carriage provided with a holding edge and a shearing edge movable vertically, means for operating said carriages, a track for said carriages, an elevating rail for operating said edges, and means in said carriage for causing said edges to adhere closely to the path of said elevating rail.

13. In a machine of the character described provided with ribbon cutting mechanism, glue affixing means, and pasting means for affixing cut sections of ribbon transversely to a paper roll, the combination of a traveling conveyor carriage provided with a holding edge and a shearing edge movable vertically, said shearing edge extending further from said carriage than said holding edge, means for operating said carriages, a track for said carriages, and an elevating rail for operating said edges, said rail having a maximum effect at the point of cutting operation and minimum effect at point of pasting operation.

14. In a machine of the character described, the combination of ribbon cutting mechanism, glue affixing means, pasting means, a series of traveling conveyor carriages, and means for simultaneously operating said carriages and said pasting means, said cutting mechanism and glue affixing means being operated severally by said carriages.

In testimony whereof, I have signed my name to this specification.

JOHN PARSONS.